United States Patent [19]

Walker

[11] Patent Number: 5,663,878

[45] Date of Patent: Sep. 2, 1997

[54] APPARATUS AND METHOD FOR GENERATING A LOW FREQUENCY AC SIGNAL

[75] Inventor: Jimmy Aubrey Walker, San Diego, Calif.

[73] Assignee: Unitrode Corporation, Merrimack, N.H.

[21] Appl. No.: 619,998

[22] Filed: Mar. 21, 1996

[51] Int. Cl.$^6$ .................................................. H02M 5/22
[52] U.S. Cl. ........................................ 363/159; 363/8
[58] Field of Search ................. 363/8, 157, 159, 363/163, 165

[56] References Cited

U.S. PATENT DOCUMENTS

| | | | |
|---|---|---|---|
| 3,609,591 | 9/1971 | Van Hensbergen | 331/108 B |
| 3,626,201 | 12/1971 | Chambers, Jr. | 307/127 |
| 3,886,321 | 5/1975 | Krasin et al. | 179/84 R |
| 4,071,709 | 1/1978 | Lee et al. | 179/18 HB |
| 4,132,864 | 1/1979 | Feng | 179/18 FA |
| 4,156,150 | 5/1979 | Harrigan et al. | 307/2 |
| 4,166,930 | 9/1979 | Rovnyak | 179/18 HB |
| 4,201,897 | 5/1980 | Dorth et al. | 179/84 R |
| 4,205,204 | 5/1980 | Clenney | 179/16 F |
| 4,445,007 | 4/1984 | Forestier | 179/175.3 R |
| 4,492,821 | 1/1985 | Kopetzky | 179/18 FA |
| 4,894,766 | 1/1990 | De Agro | 363/159 |
| 4,899,358 | 2/1990 | Blakley | 379/67 |
| 4,922,490 | 5/1990 | Blakley | 370/110.1 |
| 5,007,076 | 4/1991 | Blakley | 379/67 |
| 5,027,391 | 6/1991 | O'Neill et al. | 379/373 |
| 5,144,652 | 9/1992 | Smits | 379/102 |
| 5,224,155 | 6/1993 | Satomi et al. | 379/100 |
| 5,260,996 | 11/1993 | Dillon et al. | 379/418 |
| 5,285,371 | 2/1994 | Sanada et al. | 363/159 X |
| 5,321,596 | 6/1994 | Hurst | 363/8 |
| 5,323,461 | 6/1994 | Rosenbaum et al. | 379/399 |
| 5,406,623 | 4/1995 | Rovik | 379/418 |

*Primary Examiner*—Peter S. Wong
*Assistant Examiner*—Y. J. Han
*Attorney, Agent, or Firm*—Weingarten, Schurgin, Gagnebin & Hayes LLP

[57] ABSTRACT

An apparatus and method for generating a low frequency AC signal such as a ringing voltage signal for a telephone subscriber interface unit or the like. The apparatus comprises an oscillator which drives a pair of counters whose outputs differ by a desired low frequency. The output of the first counter is fed to a controlled current source so as to excite a resonant tank circuit and thereby provide a high voltage sinusoidal signal. The output of the second counter drives a switch which samples the high voltage sinusoidal signal. An alias frequency is thus generated which is filtered by an output capacitor. The method comprises steps which follow directly from the above-described apparatus.

12 Claims, 10 Drawing Sheets

APPARATUS AND METHOD FOR GENERATING A LOW FREQUENCY AC SIGNAL

FIELD OF INVENTION

The present invention relates generally to power conversion circuits and, more particularly, to an apparatus and method for generating a low frequency AC signal such as a ringing voltage signal for a telephone subscriber interface unit or the like.

BACKGROUND OF THE INVENTION

At times it is desirable to develop low frequency AC power from a lower DC voltage. One particular application wherein such a conversion is desirable is in the generation of a ringing voltage signal for telecommunications wherein a signal of 50 to 100 VAC at 20 Hz or thereabouts is required and the available source is typically 12, −24, or −48 VDC. The conversion is typically accomplished in two stages. The first stage is a DC to DC conversion stage, which provides a sufficiently high DC voltage signal for the second stage. The second stage consists of amplifying an AC reference signal with a linear or switching mode power amplifier. In addition to power gain, it is also generally necessary to have some form of sinusoidal reference for the amplifier.

Although the above-described conversion process does accomplish its objective of generating a ringing voltage signal, there are several disadvantages that accompany its use. For instance, large and expensive components are typically required to handle the high power, low frequency signals which are involved in the conversion process. Also, highly accurate filtering is typically required to select and control the frequency of the output signal. Furthermore, a feedback control loop is typically required to achieve a desired amplitude accuracy.

SUMMARY OF THE INVENTION

In view of the above-mentioned disadvantages of the prior art, it would be desirable to provide an apparatus and method for generating a low frequency AC signal such as a ringing voltage signal for a telephone subscriber interface unit or the like which overcomes the above-described shortcomings by deriving the ringing voltage signal from low power, high frequency signals. Such an apparatus and method would require mostly small, low cost components because of the low power, high frequency signals involved. Also, little filtering would be required since the frequency of the output signal would be many times lower than that of the low power, high frequency signals. Furthermore, since such an apparatus and method would inherently employ moderate to low impedance devices with predictable transfer functions, sufficient accuracy would be obtained without the need for a feedback control loop.

The present invention contemplates such an apparatus and method for generating a low frequency AC signal such as a ringing voltage signal for a telephone subscriber interface unit or the like by deriving the ringing voltage signal from low power, high frequency signals.

An apparatus according to the present invention comprises: means for generating a first sinusoidal signal oscillating at a first frequency; means for sampling the first sinusoidal signal at a second frequency; and means for converting the sampled signal into a second sinusoidal signal oscillating at a third frequency, wherein the third frequency is the difference between the first frequency and the second frequency.

A method according to the present invention comprises the steps of: generating a first sinusoidal signal oscillating at a first frequency; sampling the first sinusoidal signal at a second frequency; and converting the sampled signal into a second sinusoidal signal oscillating at a third frequency, wherein the third frequency is the difference between the first frequency and the second frequency.

The above-described apparatus and method requires mostly small, low cost components because of the low power, high frequency signals involved. Also, little filtering is required since the frequency of the output signal is a small fraction of the low power, high frequency signals. Furthermore, since such an apparatus and method inherently employs moderate to low impedance devices with predictable transfer functions, sufficient accuracy is obtained without the need for a feedback control loop.

From the above descriptive summary it is apparent how the present invention apparatus and method overcome the shortcomings of the above-mentioned prior art.

Accordingly, the primary object of the present invention is to provide an apparatus and method for generating a low frequency AC signal such as a ringing voltage signal for a telephone subscriber interface unit or the like by deriving the ringing voltage signal from low power, high frequency signals.

The above-stated primary object, as well as other objects, features, and advantages, of the present invention will become readily apparent from the following detailed description which is to be read in conjunction with the appended drawings.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF A PREFERRED EMBODIMENT

Figure 1:
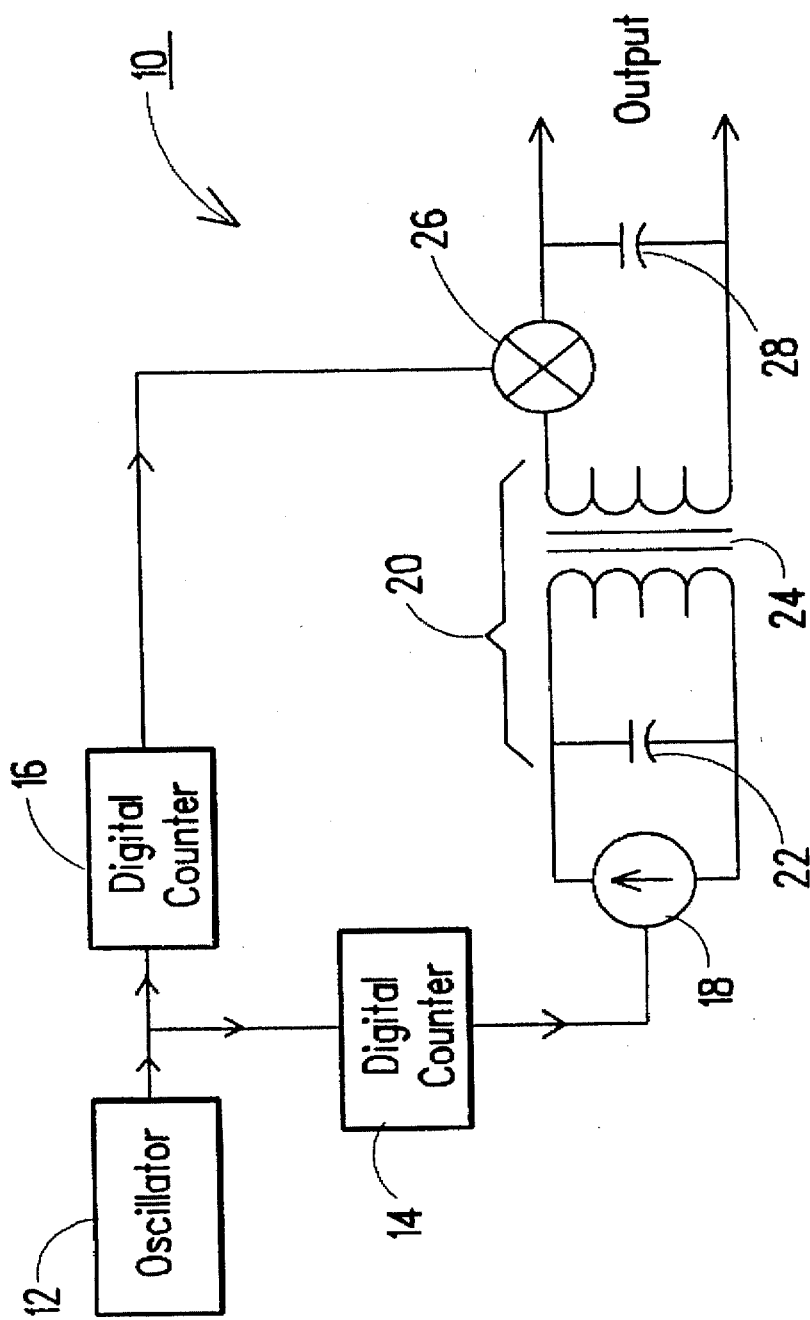
FIG. 1 is a schematic block diagram of a circuit for generating a low frequency AC signal such as a ringing voltage signal according to the present invention.

Referring to FIG. 1, there is shown a schematic block diagram of a circuit 10 for generating a low frequency AC signal such as a ringing voltage signal according to the present invention. The circuit 10 comprises an oscillator 12, a first digital counter 14, a second digital counter 16, a controlled current source 18, a tank circuit 20 comprising a capacitor 22 and a transformer 24, a switch 26, and an output capacitor 28.

The oscillator 12 drives the first 14 and second 16 counters, whose outputs differ by a desired low frequency. The output of the first counter 14 is fed to the controlled current source 18 so as to excite the resonant tank circuit 20. The transformer 24 has a turns ratio which is sufficient to provide a desired high output voltage. The output of the second counter 16 drives the switch 26 which samples the resonant waveform generated by the tank circuit 20. An alias frequency is thus generated which is filtered by the output capacitor 28.

Figure 2:
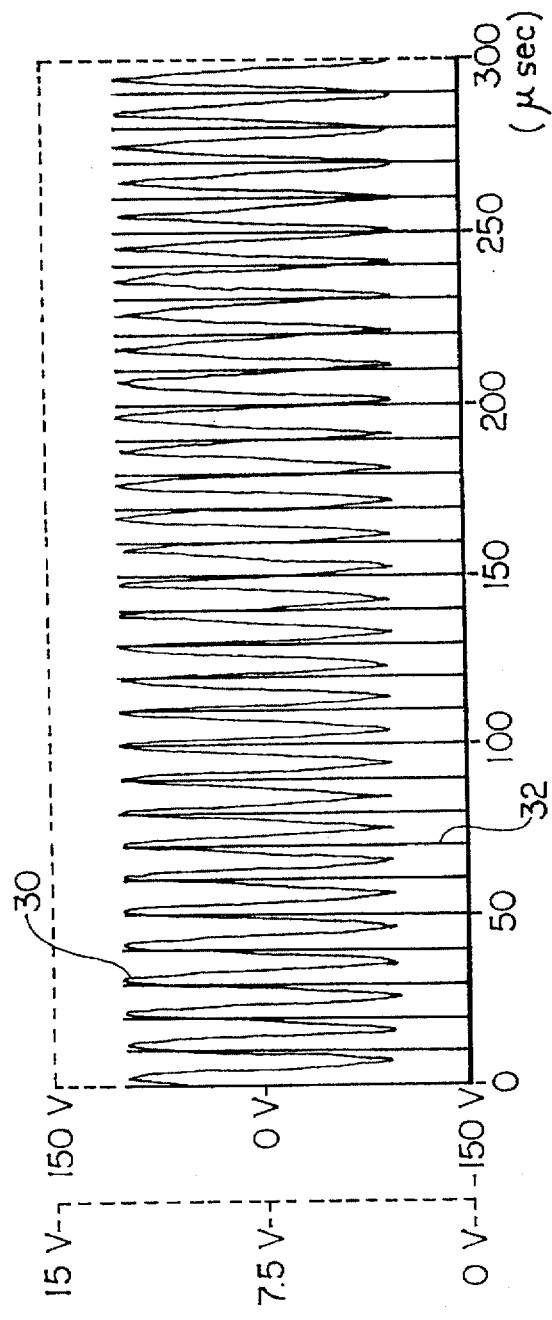
FIG. 2 illustrates ideal waveforms for a sinusoidal signal and a periodic sampling signal generated in the circuit shown in FIG. 1.

Referring to FIG. 2, there are shown two ideal waveforms 30 and 32 for signals generated in the circuit 10 of FIG. 1. The first waveform 30 represents a sinusoidal signal measured across the secondary leads of the transformer 24. This signal has an amplitude of approximately 90 VAC RMS and is oscillating at a first frequency, which in this illustrative case is approximately 103 kHz. The second waveform 32, which is superimposed over the first waveform 30, represents a periodic sampling signal measured at the output of the second digital counter 16 or at the control input of the switch 26. This signal has an amplitude of approximately 12 VDC and is periodic at a second frequency, which in this illustrative case is approximately 100 kHz.

Figure 3:
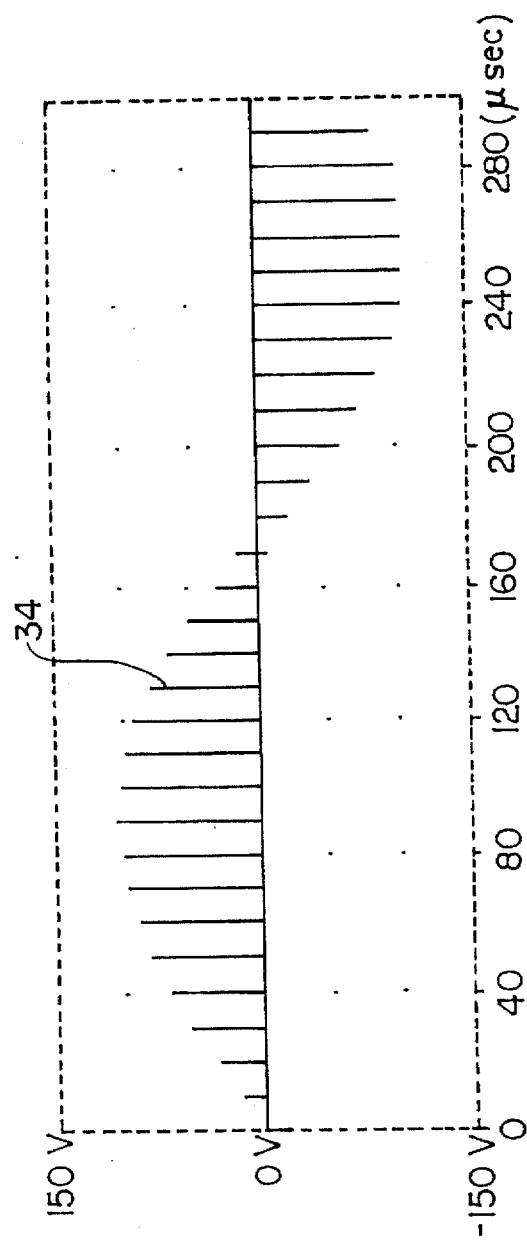
FIG. 3 illustrates an ideal waveform for a sampled sinusoidal signal generated in the circuit shown in FIG. 1, absent the output capacitor.
Figure 4:
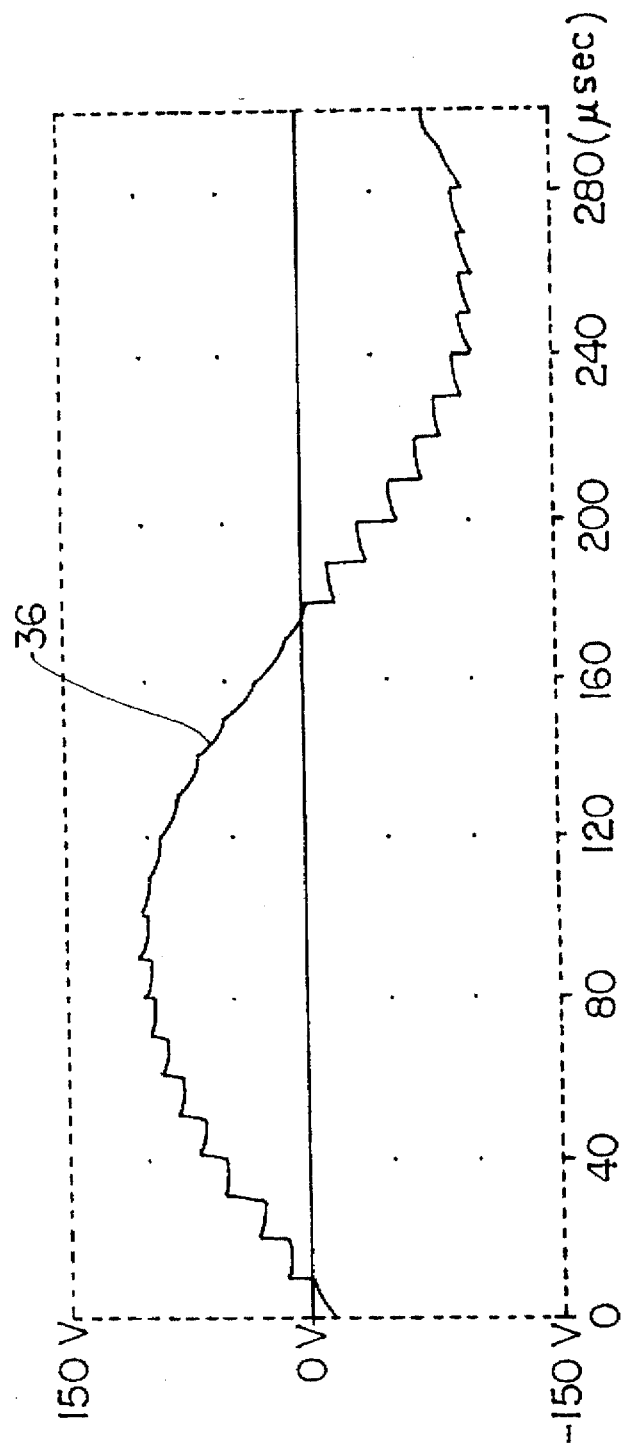
FIG. 4 illustrates an ideal waveform for a sampled sinusoidal signal generated in the circuit shown in FIG. 1, with the output capacitor in place.

Referring to FIG. 3, there is shown an ideal waveform 34 for a signal generated in the circuit 10 of FIG. 1 with the output capacitor 28 removed. This third waveform 34 represents a sampled sinusoidal signal measured at the output of the switch 26. Referring to FIG. 4, there is shown an ideal waveform 36 for a signal generated in the circuit 10 of FIG. 1 with the output capacitor 28 in place. This fourth waveform 36 represents the sampled sinusoidal signal measured across the output capacitor 28. It can be readily seen that the frequency of this sampled sinusoidal signal is approximately 3 kHz, which is the frequency difference between the signals represented by the first waveform 30 and second waveform 32. It is this concept that is central to the present invention.

At this point it should be noted that although the frequency at which the sinusoidal signal is sampled has been described above as being less than the frequency of the sinusoidal signal, it is within the scope of the present invention that the frequency at which the sinusoidal signal is sampled may be greater than the frequency of the sinusoidal signal. It is the difference between these two frequencies, not their individual values, that determines the output frequency.

Figure 5:
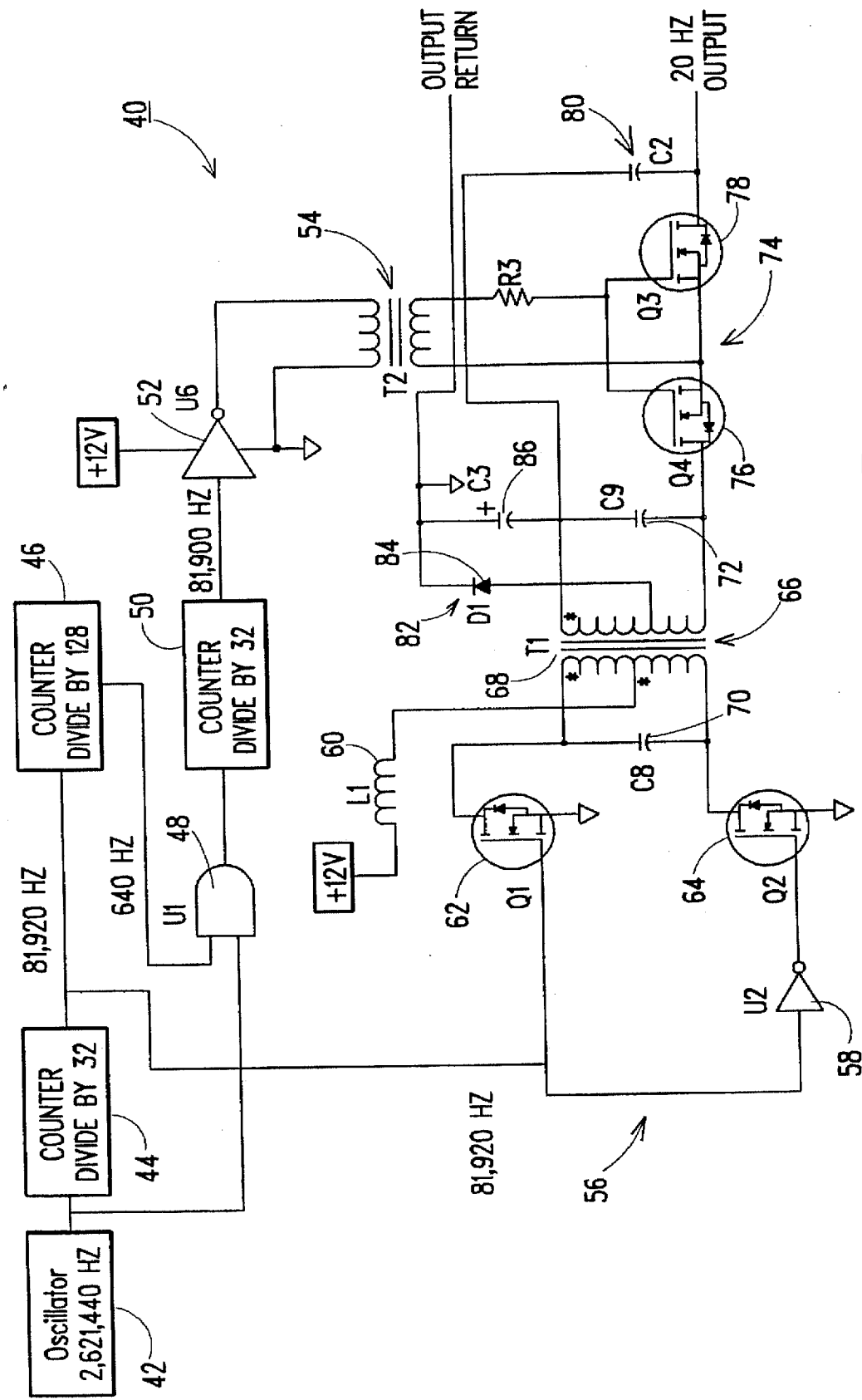
FIG. 5 is a simplified schematic representation of a circuit for generating a low frequency AC signal such as a ringing voltage signal according to the present invention.

Referring to FIG. 5, there is shown a simplified schematic representation of a circuit 40 for generating a low frequency AC signal such as a ringing voltage signal according to the present invention. The circuit 40 is designed so as to provide an output signal having an amplitude of 90 VAC RMS and an oscillating frequency of 20 Hz, which is typical for a ringing voltage signal for telecommunications. This output signal is generated according to the concept described above.

The circuit 40 comprises an oscillator 42, a first divide by 32 digital counter 44, a divide by 128 digital counter 46, a masking gate 48, a second divide by 32 digital counter 50, a line driver 52, an isolation transformer 54, a controlled current source 56 comprising an inverter 58, an inductor 60, and a first pair of transistors 62 and 64, a tank circuit 66 comprising a transformer 68 and a pair of resonant capacitors 70 and 72, a sampling switch 74 comprising a second pair of transistors 76 and 78, and an output capacitor 80.

The oscillator 42 provides a digital signal having a frequency of 2,621,440 Hz. This signal is divided down by the first divide by 32 digital counter 44 into a 81,920 Hz digital signal, which is used for dual purposes. The 81,920 Hz digital signal is fed to the controlled current source 56 wherein the first pair of transistors 62 and 64 are alternatively turned on and off so as to allow current from the inductor 60 to pass through respective portions of the primary winding of the transformer 68. Thus, the tank circuit 66, through the use of the pair of resonant capacitors 70 and 72 and an appropriate turns ratio in the transformer 68, provides a sinusoidal signal having an amplitude of 90 VAC RMS and an oscillating frequency of 81,920 Hz. It should be noted that this sinusoidal signal is offset by −48 VDC, as is common in telecommunications, through offset circuitry 82 comprising a diode 84 and a capacitor 86.

The 81,920 Hz digital signal is also fed to the divide by 128 digital counter 46 so as to provide a 640 Hz digital signal. This 640 Hz digital signal, which has a duty cycle that is disproportionate in favor of the active "high" state, is used to mask out a pulse of the 2,621,440 Hz digital signal from the oscillator 42 through the masking gate 48. The output of the masking gate 48 is thus a hybrid digital signal which is oscillating at 2,621,440 Hz for the majority of the time, but is missing single pulses at a 640 Hz rate. The hybrid digital signal is fed to the second divide by 32 digital counter 50 which generates a 81,900 Hz digital signal having a duty cycle that is disproportionate in favor of the inactive "low" state. This 81,900 Hz digital signal is then fed to the line driver 52 which drives the primary winding of the isolation transformer 54. The secondary winding leads of the isolation transformer 54 are tied to the gates of the pair of transistors 76 and 78 and to a common tie point between these transistors 76 and 78, respectively. The isolation transformer 54 and the common tie point configuration are required because of the high and varying voltages being handled by the transistors 76 and 78.

The sampling switch 74 acts to sample the sinusoidal signal output by the tank circuit 66 at a rate of 81,900 Hz. The sampled signal has an alias frequency which is the difference between the frequency of the sampling signal (81,900 Hz) and the frequency of the sinusoidal signal (81,920 Hz). This sampled signal is filtered by the output capacitor 80 so as to provide a sinusoidal signal having a 20 Hz waveform that envelopes the pulses of the sampled signal.

In correspondence with what was previously discussed, it should be noted that instead of masking out a pulse of the 2,621,440 Hz digital signal, it is within the scope of the present invention to have an additional pulse added to the 2,621,440 Hz digital signal at a 640 Hz rate so as to generate a 81,940 Hz sampling signal. Such a change to the circuit 40 would be covered by the central concept of the present invention in that it is the frequency difference between the sampling signal and the signal to be sampled, not their individual values, that determines the output frequency.

Figure 6A:
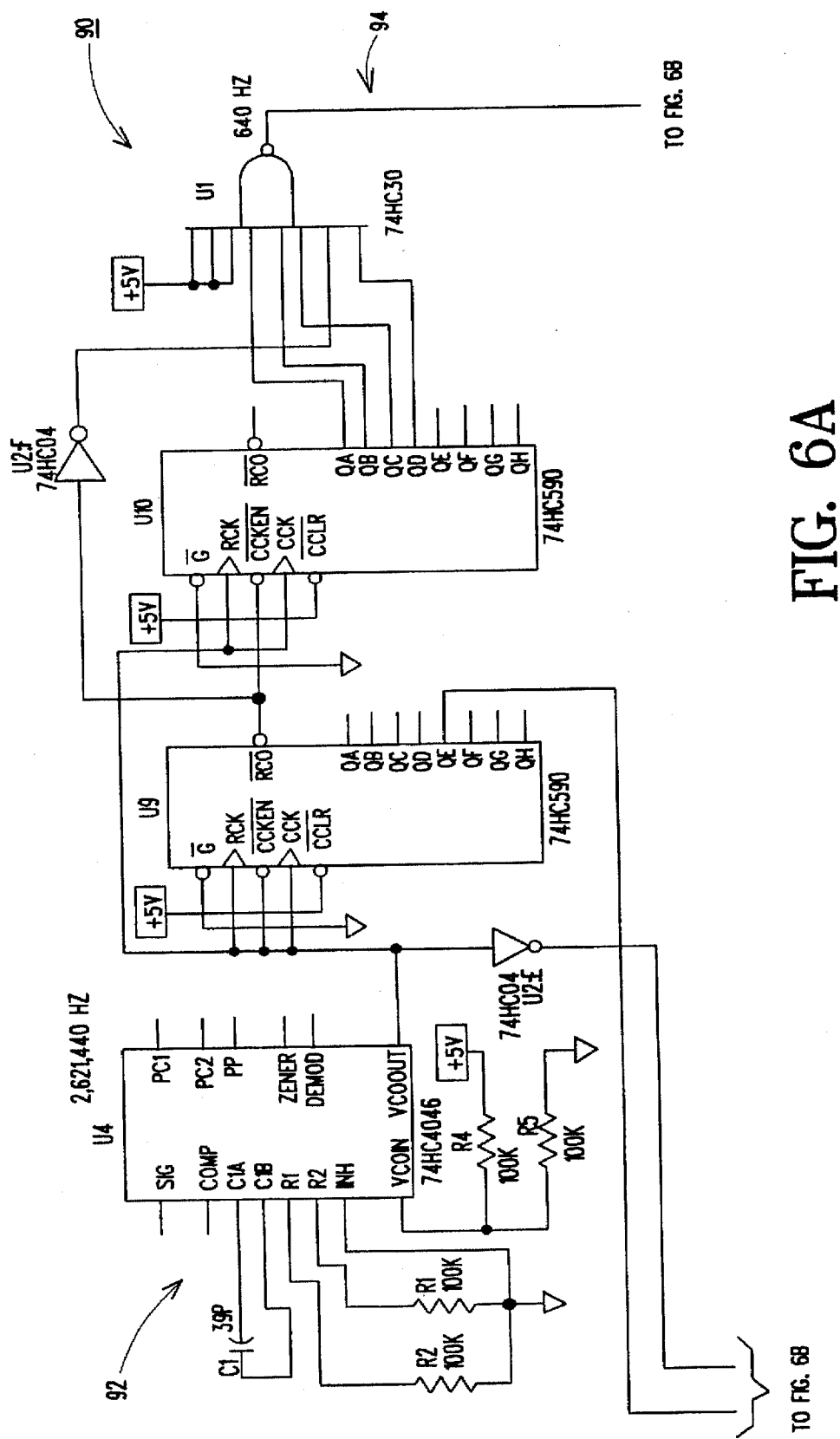
FIG. 6 is a detailed schematic representation of a circuit for generating a low frequency AC signal such as a ringing voltage signal according to the present invention.
Figure 6B:
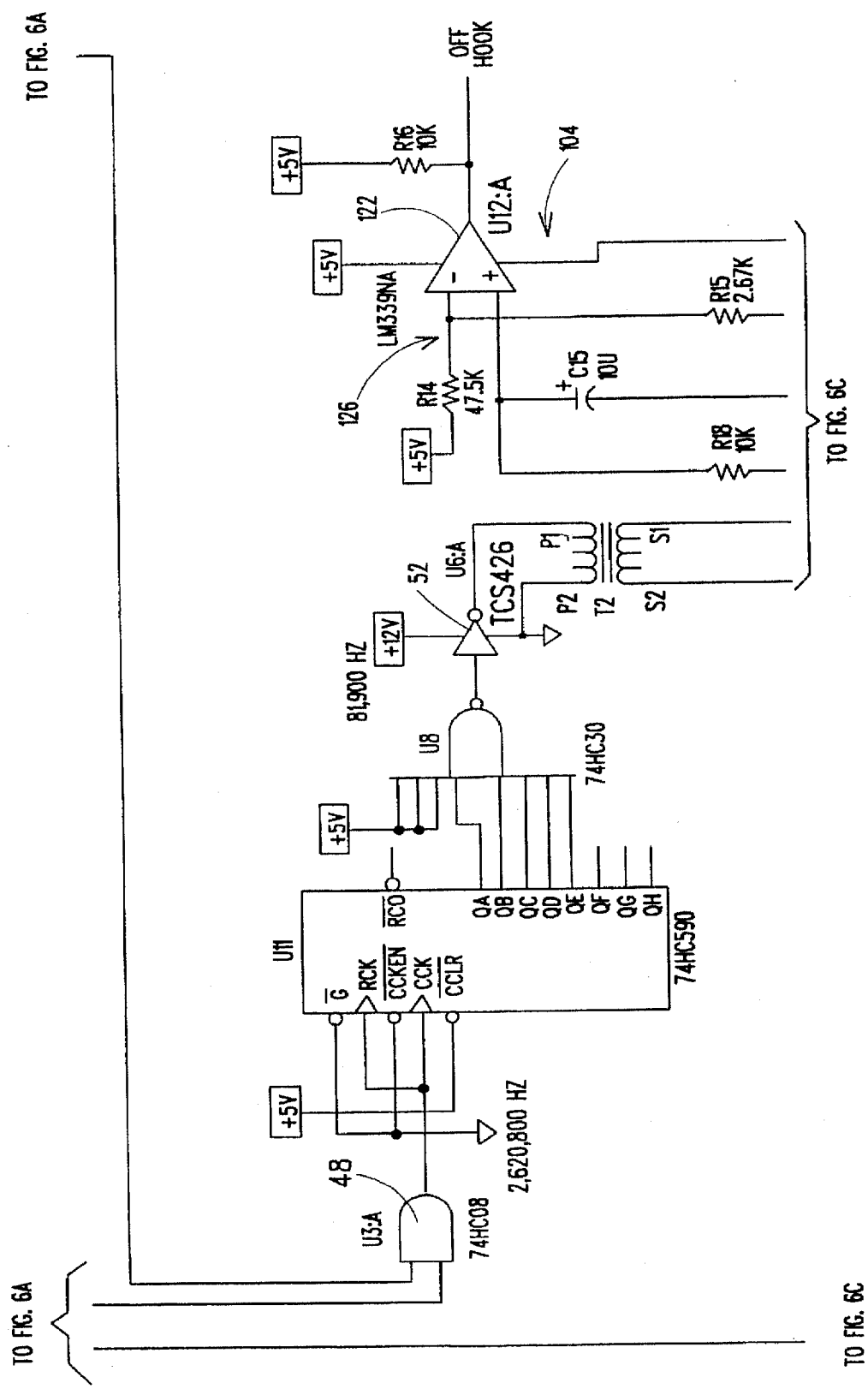
Figure 6C:
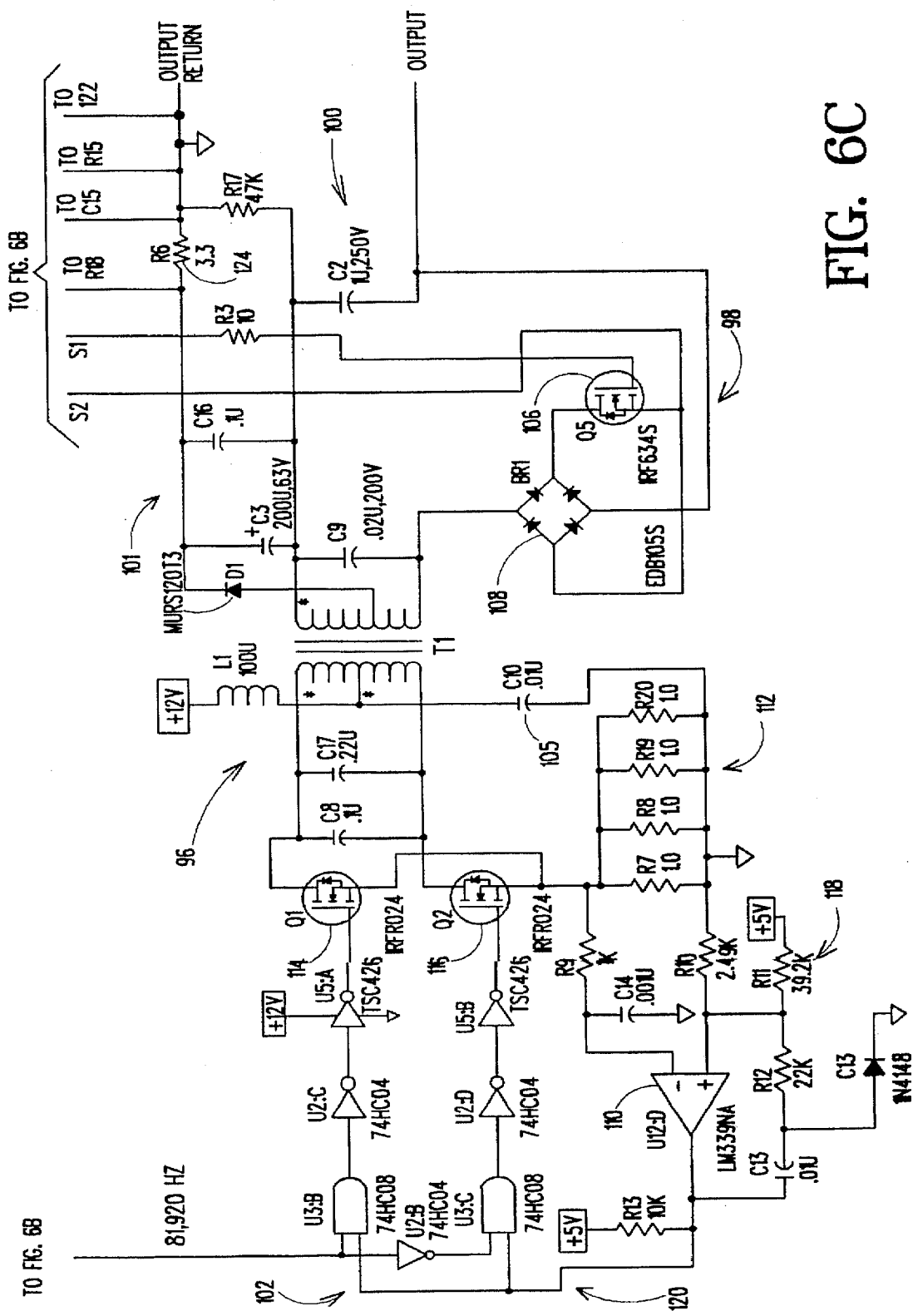

Referring to FIG. 6, there is shown a detailed schematic representation of a circuit 90 for generating a low frequency AC signal such as a ringing voltage signal according to the present invention. Similar to the circuit 40 shown in FIG. 5, the circuit 90 is designed so as to provide an output signal, that is offset by −48 VDC, having an amplitude of 90 VAC RMS and an oscillating frequency of 20 Hz. Also similar to the circuit 40 shown in FIG. 5, the circuit 90 comprises oscillator circuitry 92, divider and driver circuitry 94, sinusoidal signal generation circuitry 96, switching circuitry 98, output signal conditioning circuitry 100, and DC offset circuitry 101. In addition to the above-listed items, the circuit 90 also comprises current limiting protection circuitry 102, off-hook signal detection circuitry 104, and a capacitor 105 for draining energy from the primary side of the sinusoidal signal generation circuitry 96.

At this point it should be noted that the switching circuitry 98 comprises a single transistor 106 and a diode bridge 108 instead of two transistors. Indeed, the switching circuitry 98 may comprise any device having two states, one low impedance and one high impedance, controlled by a small signal, and capable of changing between the two states very quickly. This includes bipolar transistors or MOSFET's or other devices that meet the following requirements: 1.) current flow in both directions; 2.) voltage blocking of both polarities; 3.) a voltage rating that is at least equal to the peak-to-peak output voltage (which is also equal to the peak-to-peak voltage from the resonant converter); and 4.) a peak current rating of 1/D times the output current where D is the duty Cycle of the sampling pulse. Since bipolar transistors require a lower drive voltage than MOSFET's, the isolation transformer would be smaller for bipolar transistors. Bipolar transistors are also likely to be less expensive, but their switching speed is questionable. Thus, rather than have two transistors back to back, one transistor may be placed in a diode bridge to accomplish the bipolar switching. There may be other devices that are now available or that will be available in the near future which also have the above-stated requisite characteristics.

At this point it should also be noted that control of the difference frequency may be accomplished through the use of other means such as phase locked loop circuitry.

The current limiting protection circuitry 102 comprises a comparator 110 and a bank of resistors 112 for sensing the current passing through the push-pull transistors 114 and 116. When such current exceeds a threshold value set by a first voltage divider circuit 118, the transistors 114 and 116 are turned off through gating circuitry 120. This current limiting protection circuitry 102 directly protects the push-pull transistors 114 and 116, and indirectly protects the switching circuitry 98.

The off-hook signal detection circuitry 104 also comprises a comparator 122 and a low value resistor 124 for sensing the current through the DC offset circuitry 101. When such current exceeds a threshold value set by a second voltage divider circuit 126, an off-hook signal is generated.

Figure 7:
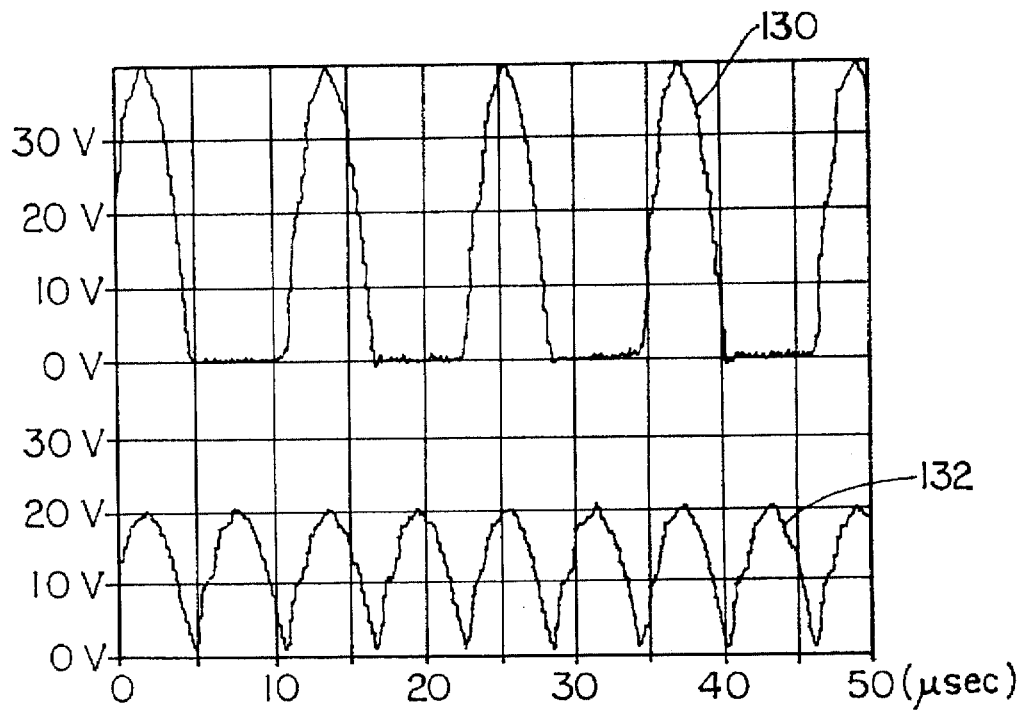
FIG. 7 shows waveforms for a half wave rectified signal and a full wave rectified signal generated in the circuit shown in FIG. 6.

Referring to FIG. 7, there are shown two waveforms 130 and 132 for signals generated in the circuit 90 of FIG. 6. The first waveform 130 shows a half wave rectified signal measured across the drain of push-pull transistor 114 and ground. The second waveform 132 shows a full wave rectified signal measured across capacitor 105.

Figure 8:
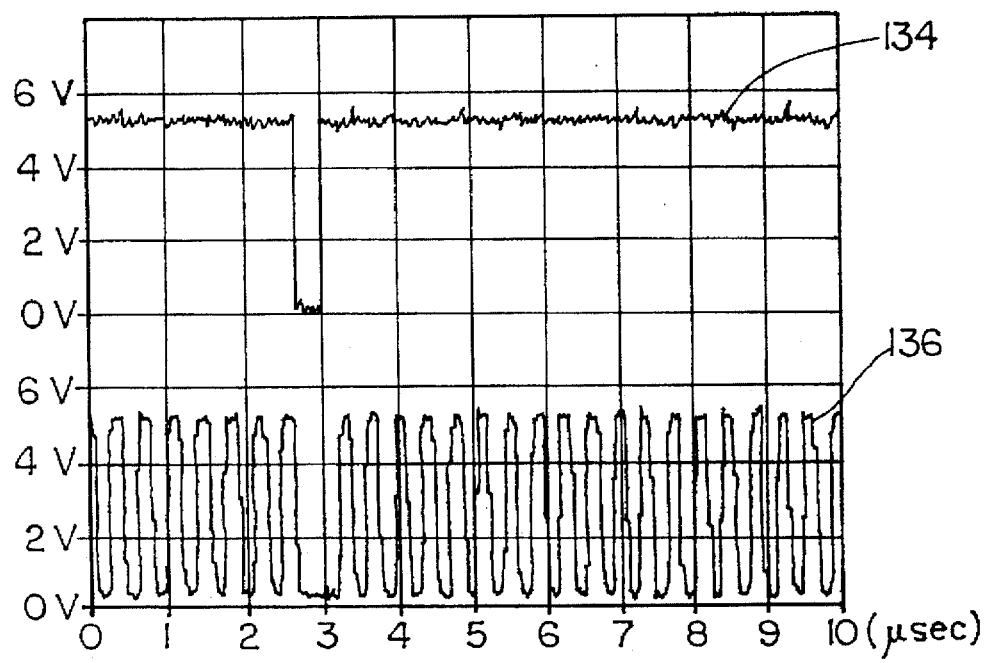
FIG. 8 shows waveforms for a 640 Hz digital signal and a hybrid digital signal generated in the circuit shown in FIG. 6.

Referring to FIG. 8, there are shown two waveforms 134 and 136 for signals generated in the circuit 90 of FIG. 6. The first waveform 134 shows a 640 Hz digital signal measured at the input of the masking gate 48. The second waveform 136 shows a hybrid digital signal measured at the output of the masking gate 48. As can be readily seen from the second waveform 136, the hybrid digital signal is oscillating at 2,621,440 Hz for the majority of the time, but is missing single masked pulse.

Figure 9:
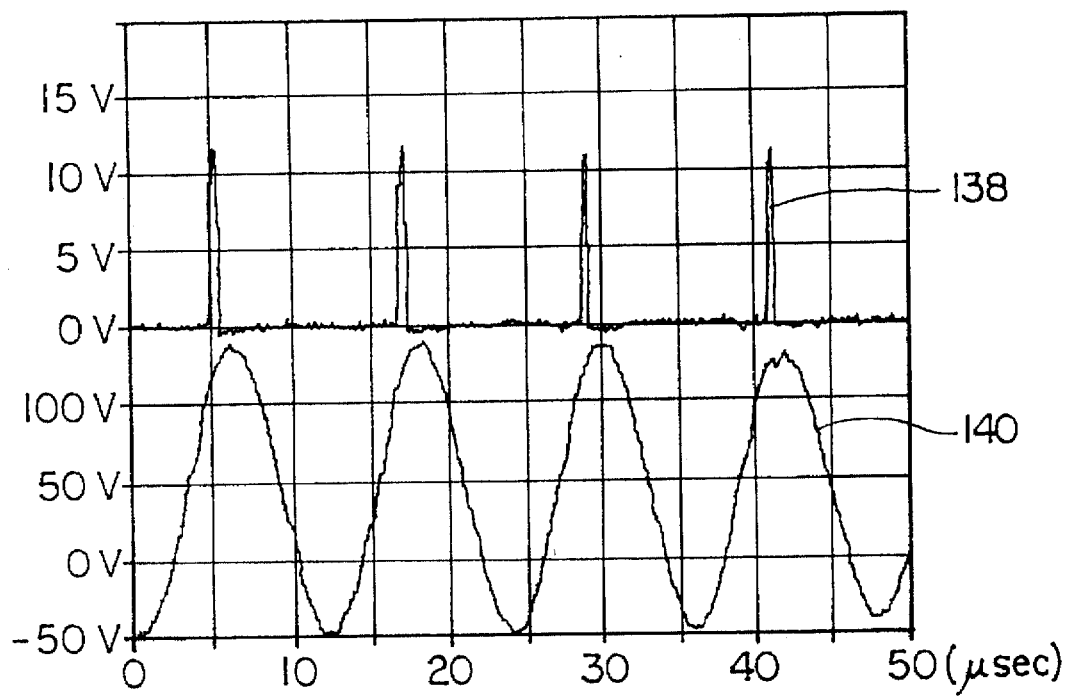
FIG. 9 shows waveforms for an 81,900 Hz sampling signal and an 81,920 Hz sinusoidal signal generated in the circuit shown in FIG. 6.

Referring to FIG. 9, there are shown two waveforms 138 and 140 for signals generated in the circuit 90 of FIG. 6. The first waveform 138 shows an 81,900 Hz sampling signal measured at the output of the line driver 52. The second waveform 140 shows an 81,920 Hz sinusoidal signal measured between the sinusoidal input to the diode bridge 108 and ground. As can be readily seen from the second waveform 140, the 81,920 Hz sinusoidal signal is offset by −48 VDC.

Figure 10:
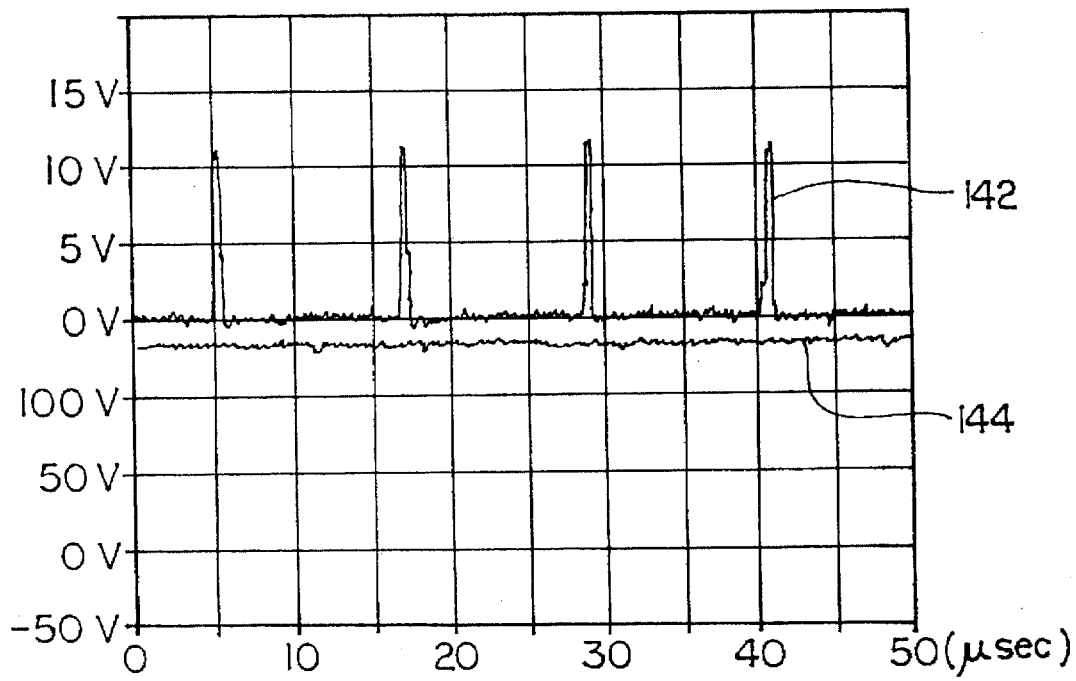
FIG. 10 shows waveforms for an 81,900 Hz sampling signal and a 20 Hz sinusoidal signal generated in the circuit shown in FIG. 6.

Referring to FIG. 10, there are shown two waveforms 142 and 144 for signals generated in the circuit 90 of FIG. 6. The first waveform 142 again shows the 81,900 Hz sampling signal measured at the output of the line driver 52. The second waveform 144 shows a 20 Hz sinusoidal signal at the output of the circuit 90.

Figure 11:
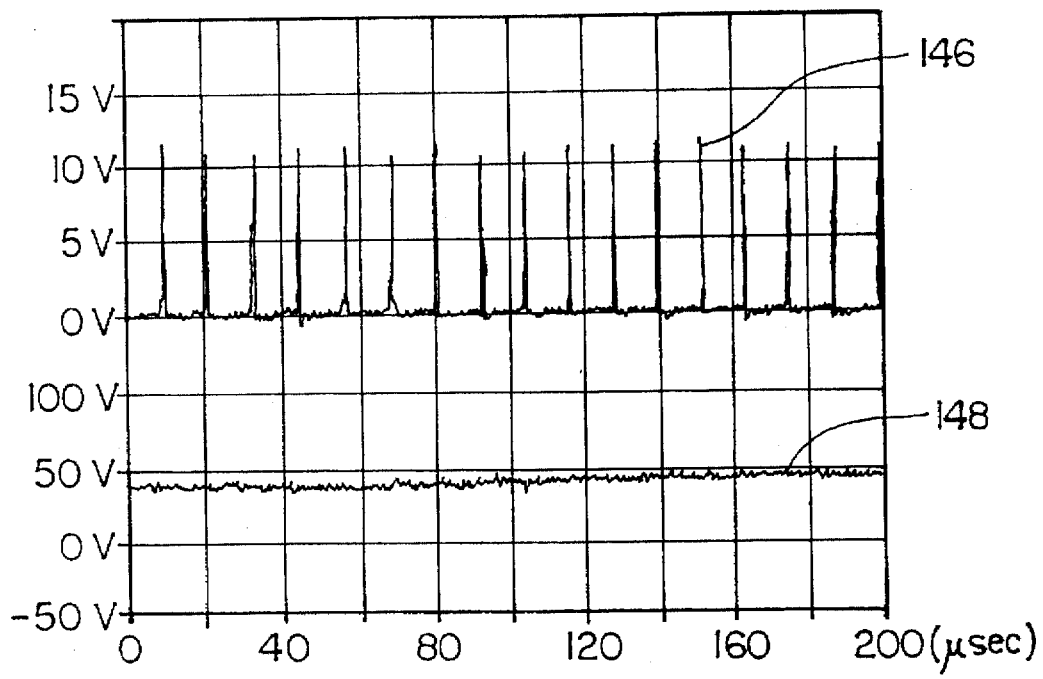
FIG. 11 shows waveforms for an 81,900 Hz sampling signal and a 20 Hz sinusoidal signal generated in the circuit shown in FIG. 6.

Referring to FIG. 11, there are shown two waveforms 146 and 148 for signals generated in the circuit 90 of FIG. 6. The first waveform 146 again shows the 81,900 Hz sampling signal measured at the output of the line driver 52, but at a different time base. The second waveform 148 again shows the 20 Hz sinusoidal signal at the output of the circuit 90, but at a different time base.

Figure 12:
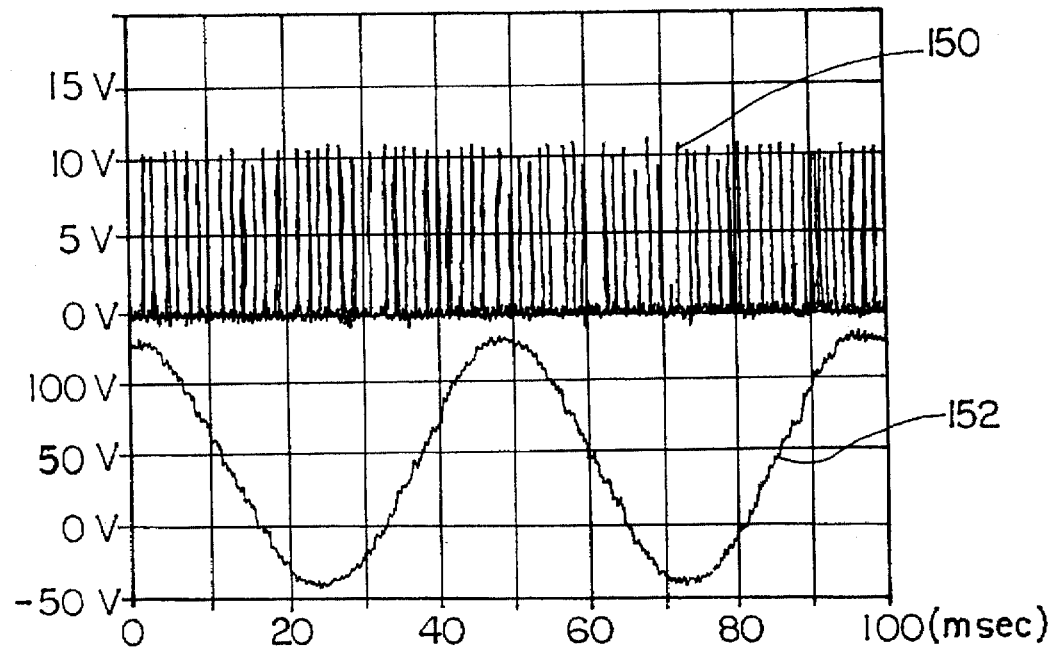
FIG. 12 shows waveforms for an 81,900 Hz sampling signal and a 20 Hz sinusoidal signal generated in the circuit shown in FIG. 6.

Referring to FIG. 12, there are shown two waveforms 150 and 152 for signals generated in the circuit 90 of FIG. 6. The first waveform 150 again shows the 81,900 Hz sampling signal measured at the output of the line driver 52, but at a different time base. The second waveform 152 again shows the 20 Hz sinusoidal signal at the output of the circuit 90, but at a different time base.

The present invention is not to be limited in scope by the specific embodiments described herein. Indeed, various modifications to the present invention, in addition to those described herein, will be apparent to those of skill in the art from the foregoing description and accompanying drawings. Thus, such modifications are intended to fall within the scope of the appended claims.

What is claimed is:

1. An apparatus for generating a low frequency AC signal, said apparatus comprising:

means for generating a first sinusoidal signal oscillating at a first frequency;

means for sampling said first sinusoidal signal at a second frequency; and means for converting said sampled signal into a second sinusoidal signal oscillating at a third frequency, said third frequency being the difference between said first frequency and said second frequency.

2. The apparatus as defined in claim 1, wherein said means for generating a first sinusoidal signal oscillating at a first frequency comprises:

a controlled current source for providing a current; and a tank circuit for converting said current into said first sinusoidal signal oscillating at said first frequency.

3. The apparatus as defined in claim 1, wherein said means for sampling said first sinusoidal signal at a second frequency comprises:

an oscillator for providing an oscillating signal;

a divider for dividing down said oscillating signal to a signal oscillating at said second frequency; and a switching circuit, controlled by said signal oscillating at said second frequency, for sampling said first sinusoidal signal at said second frequency.

4. The apparatus as defined in claim 1, wherein said means for converting said sampled signal into a second sinusoidal signal oscillating at a third frequency comprises filtering said sampled signal.

5. A method for generating a low frequency AC signal, said method comprising the steps of:

generating a first sinusoidal signal oscillating at a first frequency;

sampling said first sinusoidal signal at a second frequency; and converting said sampled signal into a second sinusoidal signal oscillating at a third frequency, said third frequency being the difference between said first frequency and said second frequency.

6. The method as defined in claim 5, wherein said step of generating a first sinusoidal signal oscillating at a first frequency comprises the steps of:

providing a controlled current; and converting said controlled current into said first sinusoidal signal oscillating at said first frequency.

7. The method as defined in claim 5, wherein said step of sampling said first sinusoidal signal at a second frequency comprises the steps of:

providing an oscillating signal;

dividing down said oscillating signal to a signal oscillating at said second frequency; and controlling a switching circuit by said signal oscillating at said second frequency so as to sample said first sinusoidal signal at said second frequency.

8. The method as defined in claim 5, wherein said step of converting said sampled signal into a second sinusoidal signal oscillating at a third frequency comprises the step of filtering said sampled signal.

9. An apparatus for generating a low frequency AC signal, said apparatus comprising:

a first circuit for generating a first sinusoidal signal oscillating at a first frequency;

a second circuit for sampling said first sinusoidal signal at a second frequency; and a third circuit for converting said sampled signal into a second sinusoidal signal oscillating at a third frequency, said third frequency being the difference between said first frequency and said second frequency.

10. The apparatus as defined in claim 9, wherein said first circuit for generating a first sinusoidal signal oscillating at a first frequency comprises:

a controlled current source for providing a current; and a tank circuit for converting said current into said first sinusoidal signal oscillating at said first frequency.

11. The apparatus as defined in claim 9, wherein said second circuit for sampling said first sinusoidal signal at a second frequency comprises:

an oscillator for providing an oscillating signal;

a divider for dividing down said oscillating signal to a signal oscillating at said second frequency; and a switching circuit, controlled by said signal oscillating at said second frequency, for sampling said first sinusoidal signal at said second frequency.

12. The apparatus as defined in claim 9, wherein said third circuit for converting said sampled signal into a second sinusoidal signal oscillating at a third frequency comprises a filter for filtering said sampled signal.

* * * * *